United States Patent [19]

Rader

[11] Patent Number: 4,972,361
[45] Date of Patent: Nov. 20, 1990

[54] FOLDED LINEAR SYSTOLIC ARRAY

[75] Inventor: Charles M. Rader, Concord, Mass.

[73] Assignee: Massachusetts Institute of Technology, Cambridge, Mass.

[21] Appl. No.: 193,813

[22] Filed: May 13, 1988

[51] Int. Cl.$^5$ ........................................... G06F 15/32
[52] U.S. Cl. ..................................... 364/736; 364/730
[58] Field of Search ....................... 364/730, 736, 735

[56] References Cited

U.S. PATENT DOCUMENTS

| | | | |
|---|---|---|---|
| 4,231,102 | 10/1980 | Barret et al. | 364/726 |
| 4,601,006 | 7/1986 | Riu | 364/726 |
| 4,727,503 | 2/1988 | McWhirter | 364/200 |

OTHER PUBLICATIONS

Curtis et al., "A Cordic Processor for Laser Trimming" IEEE Micro vol. 6, #3, pp. 61–71, Jun. 1986.
VLSI and Modern Signal Processing, by S. Y. Kung, H. J. Whitehouse, T. Kalaith, eds., (c) 1985, Prentice Hall.
Systolic Array Processor Brassboard Descriptive Summary, by R. J. Lackey, Hazeltine Corp., Dec. 1987.
A Pipelined Array for Linearly Constrained Least-Squares Optimisation, by T. J. Shepherd, J. G. McWhirter, Proc. IMA, Int. Conf. on Mathematics in Signal Processing, Bath, 1985, Revised, 1986.

Primary Examiner—Dale M. Shaw
Attorney, Agent, or Firm—Fish & Richardson

[57] ABSTRACT

Circuit for computing values of the elements of a triangular matrix, where $$\frac{N}{2} \text{ or } \frac{N+1}{2}$$

similar subcircuits provide CORDIC processing and memory, the subcircuits connected in a folded systolic array, the first subcircuit providing input capability to the array for receiving complex data containing N words, and the output of the last subcircuit coupled to its own input. The circuit may be used to process observation vector data taken from an antenna system of N elements to provide an output useful in determining weights for nulling out the observation data from a larger signal.

23 Claims, 3 Drawing Sheets

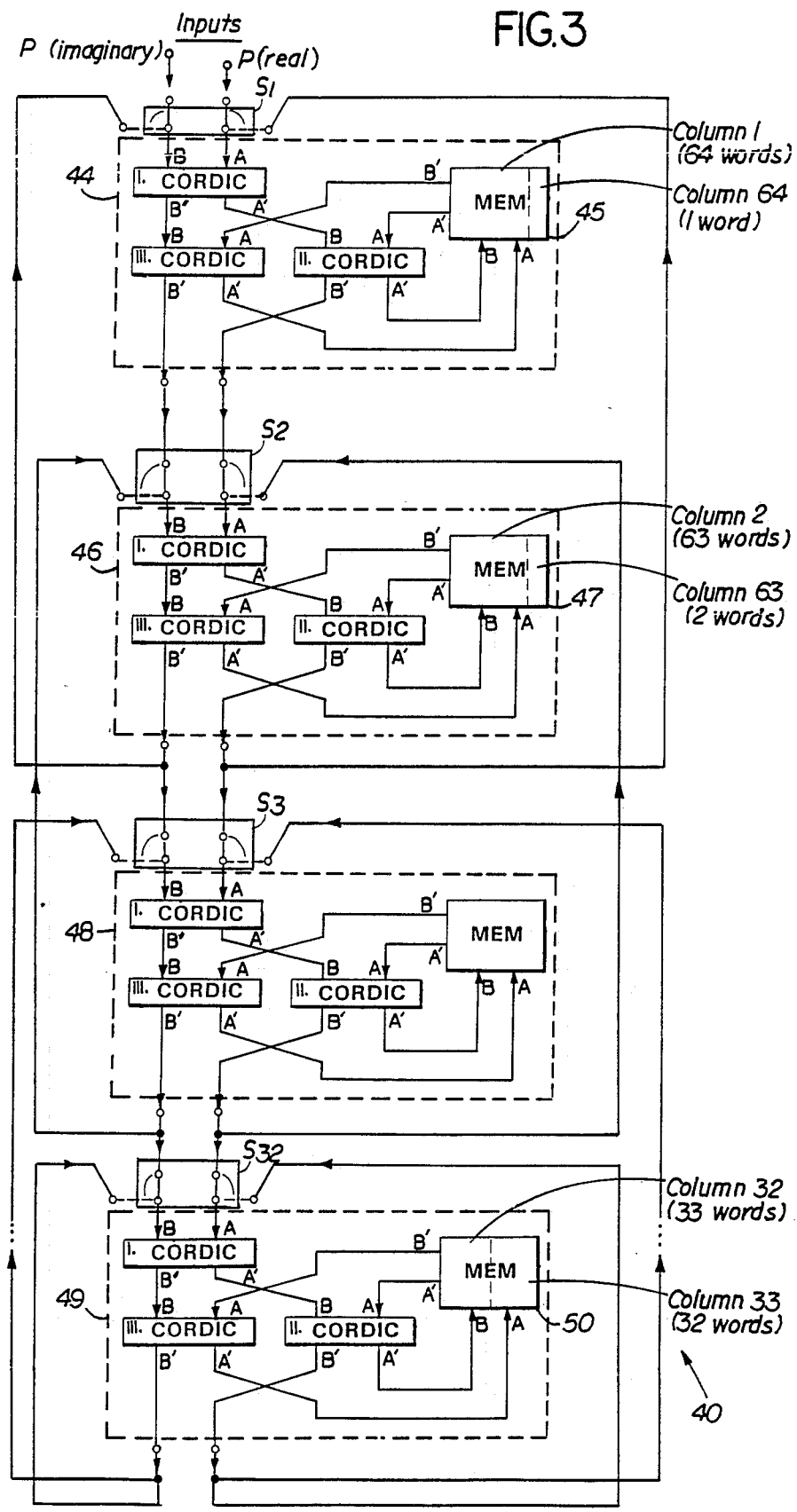

FOLDED LINEAR SYSTOLIC ARRAY

The U. S. Government has non-exclusive rights in this invention pursuant to Contract Number F19628-85-C-0002, awarded by the U.S. Air Force.

The present invention relates generally to signal nulling, and more particularly, to a matrix updating, folded linear systolic array of processors for use in a nulling system.

BACKGROUND OF THE INVENTION

Antennas, such as radar antennas, are subject to receiving both desired and undesired signals, where the latter may degrade the performance of the system of which the antenna is a part. An antenna suitable for interference cancellation may be treated as a combination of many individual antenna elements, each antenna element receiving a particular combination of wanted and unwanted signals. In fact, it is known to sum the signals of all antenna elements, giving appropriate weight to appropriate elements. Furthermore, it has been demonstrated that if the appropriate statistics are gathered, it is possible to determine the optimum weights to be applied to particular signals in order to optimize reception of the desired signals by nulling out the undesired signals. A problem arises, however, in the implementation of any weighting system, since it will require substantial computation to determine the best weights unless the number of antenna elements is a very small number.

More particularly, assume a system where an antenna has N antenna elements Each antenna element, as for example, antenna element j, receives a signal which may comprise a desired signal and/or any number of undesired signals in some linear combination, where the total unwanted signal on antenna element j is $p_j$. The collection of undesired signals o all the N antenna elements forms a vector P. Of course, it should be appreciated that the order in which each antenna element is numbered is completely arbitrary. However, once such an order has been established it should be consistently followed since it determines the order of signals in the vector P.

Naturally, P and all its components $p_j$ are functions of time. Samples of $p_j$ are obtained from time to time, with the signals on all the antenna elements sampled at the same instant. If the n-th sample on the j-th antenna element is $p_j(n)$ and the collection of all the samples at the same instant is P(n), then P(n) has N components and the component which originated as a sample from antenna element-j is the j-th component of P(n). Because of the way signals on antennas are often sampled, each of the components is generally a complex number, having a real part and an imaginary part. If n is the number of the most recent sample available, then P(n) is the current vector of observations of unwanted signals.

In many mathematical treatments of the behavior of arrays of antenna elements it is useful to know a certain $N \times N$ matrix called a 'correlation' matrix R, expressed as: $R = E(P(n) \times P^t(n))$, where E is understood to mean 'expectation of', and where the superscript t stands for the simultaneous operations of transposing a vector or matrix and conjugating all the complex numbers appearing as entries in the vector or matrix. In practice, an approximation to this expectation is measured using an average of $P(n) \times P^t(n)$, the average being taken over the current observation vector and those which have been seen up to the present.

To explain further, if all the previous observation vectors were collected together, i.e., $P(n-3), P(n-2), P(n-1)$, which might be a collection extending indefinitely far into the past, but not including the present observation vector, one could, from these samples, determine the 'previous' correlation matrix $R(n-1)$. Also, the current $R(n)$ can be determined if the current observation vector, $P(n)$, were appended to this collection of observation vectors. Furthermore, still another more up-to-date estimate of matrix R may be computed with each new observation vector appended to the last updated matrix $R(n-1)$.

In the averaging process it is generally desired to weight the most recent observations somewhat more heavily in the statistic than the older observations. This may be accomplished by using a "forgetting factor". A forgetting factor is a number smaller than 1.0 (usually only slightly less than 1.0) which may be designated as $\alpha$. Therefore, the iteration is $R(n) = \alpha^2 R(n-1) + P(n) \times P^t(n)$. Since this is an iteration, it will be understood that $R(n-1) = \alpha^2 R(n-2) + P(n-1) \times P^t(n-1)$, and so on. Therefore $R(n)$ is influenced by all the previous observation vectors, to some extent, but because of the forgetting factor $\alpha$, the influence of the older observation vectors is more and more diminished. In carrying out this iteration, it may be assumed that at some instant long ago, $R(0)$ was a matrix of all zeros. However, since $\alpha$ is less than 1.0, even if $R(0)$ were not a matrix of all zeros, after a long enough time, the current correlation matrix $R(n)$ will eventually no longer be significantly affected by the initial state $R(0)$.

The same information which is contained in $R(n)$ can be carried by an $N \times N$ lower triangular matrix, where N is the number of elements, and n is the current data set. While several forms of lower triangular matrix are operable within the present invention, for purposes of expediency, discussion here is limited to operation of the invention with respect to a particular $N \times N$ lower triangular matrix L commonly referred to as the Cholesky factor. Matrix L is determined by processing the samples which have so far been collected, being updated as each sample is collected. Therefore $L(n)$ will be understood to refer to the Cholesky factor which was computed from samples up to and including the current observation vector $P(n)$. It will be appreciated by those skilled in the art that the Cholesky factor must observe the following relationship with $L(n)$: $R(n) = L(n) \times L^t(n)$. Also, the entries along the diagonal of the matrix $L(n)$ must be real numbers.

To explain further, if all the previous observation vectors were collected together, i.e., $P(n-3), P(n-2), P(n-1)$, which might be a collection extending indefinitely far into the past, but not including the present observation vector, the 'previous' Cholesky factor $L(n-1)$ would be known. If to this collection of observation vectors, the current observation vector, $P(n)$, were appended, the current Cholesky factor $L(n)$ could be determined. Furthermore, the current Cholesky factor can be determined using only $P(n)$ and $L(n-1)$, whereby each time a new observation vector $P(n)$ is received its information is folded into the most recent L matrix (which now has become matrix $L(n-1)$) to create still another, more up-to-date Cholesky factor.

SUMMARY OF THE INVENTION

In one aspect of the present invention, a circuit is provided for computing from complex data the values of the elements of a triangular matrix representative of a correlation matrix of N columns and N rows, the circuit including either $$\frac{N}{2}$$

(where N is an even number) or $$\frac{N+1}{2}$$

where N is an "odd" number) subcircuits, each subcircuit having at least one CORDIC processor and a memory, the subcircuits connected in a folded systolic array, the first subcircuit of the array providing input capability to the array for receiving complex data containing N words, and the output of the last subcircuit being coupled to its own input. Each subcircuit updates and stores, based upon the complex data, the value of two complementary columns of the matrix, where generally the length of the two columns combined together is equal to N+1 words where N is even, or N words where N is odd.

In another aspect of the present invention, each subcircuit comprises a first, a second and a third CORDIC processor and memory, where the first CORDIC processor is disposed to perform a rotation upon the complex data to make the leading element of the data real, the output of this CORDIC processor being a second complex number and being applied along with a complex number from the memory to the inputs of the second and third CORDIC processors, where the real parts of the two above complex numbers are inputted to the second CORDIC processor and the imaginary parts of the two above complex numbers are inputted to the third CORDIC processor, the second CORDIC processor providing a real output and the third CORDIC processor providing an imaginary output, these latter two outputs being coupled to the input of at least one of the subcircuits of the array.

In yet another aspect of the present invention a circuit is disclosed which repetitively updates, with a continuous stream of current observation vectors, the Cholesky factor of a correlation matrix, where this matrix is based upon an average of the most current observation vector and those vectors which have been processed up to the present. Also, the vectors are effectively weighted from most recent to oldest, in favor of the most recent vector, as each new observation vector is added to update the Cholesky matrix.

In another aspect of the present invention, a supercell constitutes a special form of subcircuit provided with three CORDIC circuits associated with a single memory, where the supercells are arranged in a folded pipelined configuration such that vector data can be processed systolically. Generally, systolic processing refers to the rhythmic flow of data through a processor at each clock pulse analogous to blood flowing through a body, pulsing with each heart beat. The present invention makes use of systolic processing, but in a highly efficient configuration of supercells.

In another aspect of the invention, N/2 supercells are connected in a folded linear systolic array to enable repetitive updating of a Cholesky matrix having N columns and N rows (where N is an even number), or (N+1)/2 supercells (where N is an odd number). Each supercell is assigned computational responsibility for a particular pair of columns of the Cholesky matrix such that the combined length of any two paired columns equals N+1, when N is even, and N, when N is odd, except that where N is an odd number the lead supercell is assigned a single unpaired column of a length equal to N. A given supercell of this array will perform unitary matrix multiplications on stored data representing columns of an N row by N+1 column matrix comprising the most recently known Cholesky factor and the current observation vector, or on stored data representing intermediate results, such that the data stored in all the supercells will finally come to represent the updated Cholesky factor. In this process, information must be passed from supercell to supercell. The latency of the supercells is coordinated such that data from a supercell's next higher neighbor in a systolic array never arrives at the same time at that supercell's input as data arriving from that supercell's next lower neighbor of the array of supercells. An output may be taken from the array of supercells representing a Cholesky matrix updated with the most recent observation vector, which may be used in a subsequent computation to determine the optimum weights to be applied to the nulling circuit of a nulling processor to null out the undesired portion of signals received by the antenna of the system.

BRIEF DESCRIPTION OF THE DRAWINGS

A preferred embodiment of the present invention is described in the accompanying drawings, in which:

FIG. 3 is a block diagram of a folded linear systolic array of the invention.

DESCRIPTION OF THE PREFERRED EMBODIMENT

Figure 1:
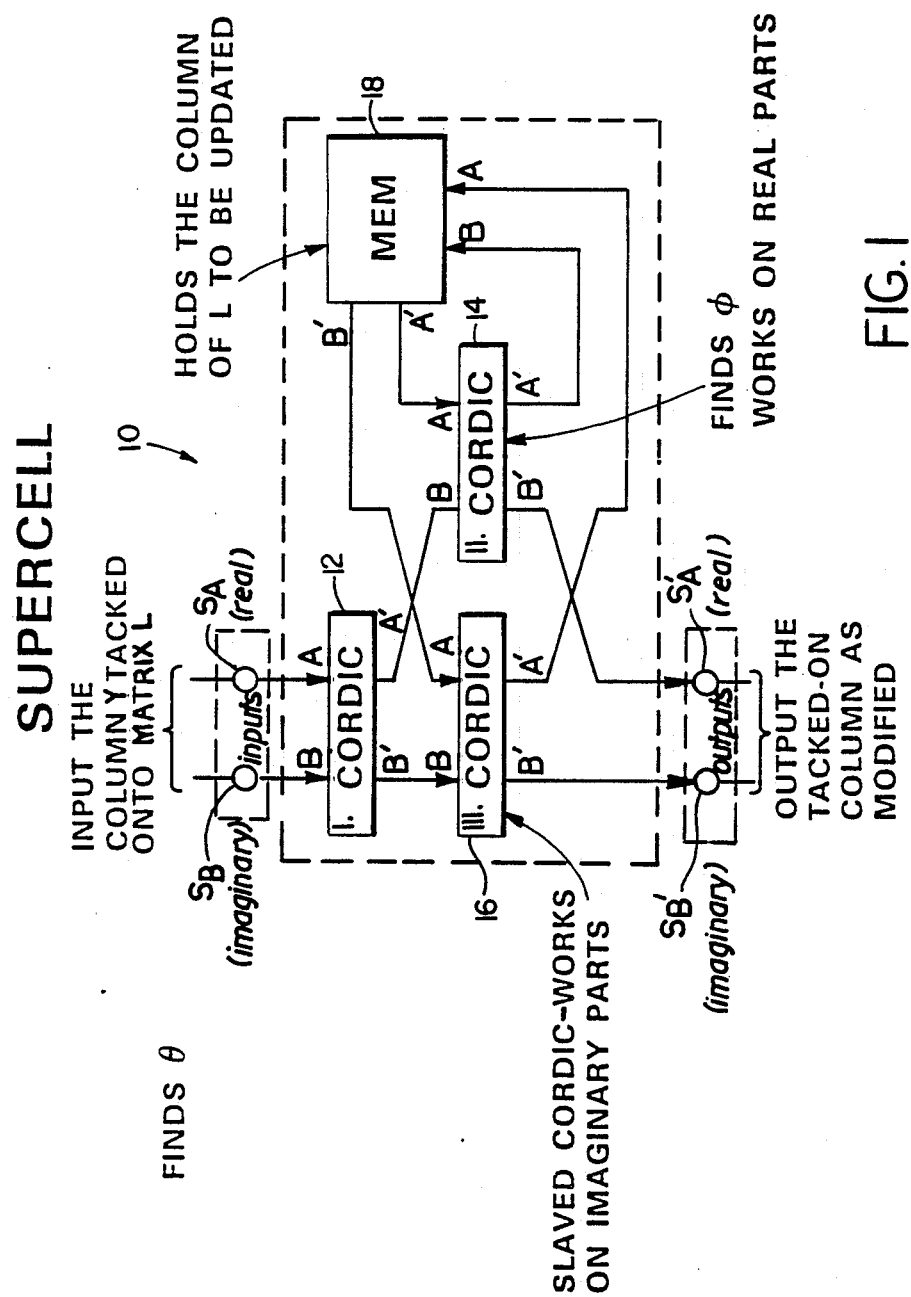
FIG. 1 is a block diagram of a supercell circuit of the invention.

The present invention provides an efficient means for computing successive matrices:

..., L(n−2), L(n−1), L(n), where a new Cholesky factor computation begins whenever a new observation vector is presented. Furthermore, in operation, the processor is designed to update the Cholesky factor repetitively.

The basic algorithm to be used may be described by matrix algebra. At the beginning of an update cycle the previous Cholesky factor L(n−1) will be held in system memory, already multiplied by the forgetting factor $\alpha$ represented as:

$$\alpha L(n-1) = \alpha \begin{bmatrix} L_{1,1}(n-1) & 0 & 0 & 0 & \ldots & 0 \\ L_{2,1}(n-1) & L_{2,2}(n-1) & 0 & 0 & \ldots & 0 \\ L_{3,1}(n-1) & L_{3,2}(n-1) & L_{3,3}(n-1) & 0 & \ldots & 0 \\ L_{4,1}(n-1) & L_{4,2}(n-1) & L_{4,3}(n-1) & L_{4,4}(n-1) & \ldots & 0 \\ \cdot & \cdot & \cdot & \cdot & & \cdot \\ \cdot & \cdot & \cdot & \cdot & & \cdot \\ \cdot & \cdot & \cdot & \cdot & & \cdot \end{bmatrix}$$

The current observation vector P(n) may be represented as:

$$P(n) = \begin{bmatrix} p_1(n) \\ p_2(n) \\ p_3(n) \\ p_4(n) \\ \cdot \\ \cdot \\ \cdot \end{bmatrix}$$

Next, $\alpha$ L(n−1) and P(n) may be appended together in a single matrix, X, with N rows and N+1 columns, as follows: X=[$\alpha$L(n−1)|P(n)].

This appended matrix X is to be right-multiplied by a succession of simple matrices, $Q_m$, with m running from 1 to 2N, where the result of each right-multiplication overwrites the contents of X, such that X←X×$Q_m$, using 2N steps. The final result is a new Cholesky matrix L(n), with N updated rows and N updated columns.

More particularly, in the first, third, fifth, and in general all odd-numbered processing steps, the matrix $Q_{2k-1}$(by which X is right-multiplied) is chosen such that only the last column of X, the one which is initially P(n), is changed. This column is multiplied by a complex number of the form (cos $\theta$+i sin $\theta$), such that $Q_{2k-1}$ has its elements given by the formulae:

$$q_{i,j} = \begin{bmatrix} 0 & i \neq j \\ 1 & i = j \leq N \\ \cos \theta + i \sin \theta & i = j = N+1 \end{bmatrix}$$

In this case $\theta$ is chosen so that one of the numbers in the last column, called the column leader, becomes, after the multiplication, a real number. It follows that $\theta$ must be determined using knowledge of the leader. The column leader for the first step is the first number in the column. The column leader for the third step is the second number of the column. The column leader for general step $m=2k-1$(as k takes on successively 1,2,3,...,N) is the k-th element in the column.

In the second, fourth, sixth and in general even-numbered steps the matrix $Q_{2k}$ (by which X is right-multiplied) is chosen such that only two of the columns of X are changed. The last column is always one of the two columns changed and the other column changed is, for the second step, the first column, for the fourth step, the second column, and, in general, for the 2k-th step (as k takes on successively 1,2,3,...,N) the k-th column of X is changed. Thus $Q_{2k}$ has its elements give by the formulae:

$$q_{i,j} = \begin{cases} \alpha \cos \phi & i = j = k \\ \alpha \cos \phi & i = j = N+1 \\ \alpha \sin \phi & i = N+1, j = k \\ -\alpha \sin \phi & i = k, j = N+1 \\ 1 & i = j \neq k, i = j \neq N+1 \\ 0 & \text{otherwise} \end{cases}$$

As a consequence of these general steps, whenever steps $m=2k-1$ or $m=2k$ are carried out, both the columns of X processed by these steps are guaranteed to have only zeros prior to the numbers designated as column leaders in said columns. These zeros need not be explicitly stored or computed.

The k-th elements in both columns to be changed are designated the leaders of their columns. Let column-k of X, which came from the previous Cholesky factor, be designated L and let the other column (the last column) be designated Y. Then the matrix multiplication carried out on the 2k-th step must replace these two columns quantities by L←$\alpha$(L cos $\phi$+Y sin $\phi$)

Y←$\alpha$(Y cos $\phi$−L sin $\phi$)

where the two actions are effected simultaneously. $\phi$ is such that the leader of Y becomes zero. It follows that $\phi$ must be determined from knowledge of the leaders of the two columns before the matrix multiplication can be applied to the remaining numbers making up these two columns. This algorithm is well known in the literature of mathematics. It is a modification (for handling complex numbers and for incorporating the forgetting factor) of a mathematical procedure called a Givens transformation.

The operations called for by this algorithm can be carried out using a well-known technique for digital arithmetic called CORDIC computation. A digital circuit designed to carry out CORDIC computation can accept pairs of digital numbers, say A and B, and operate on these pairs of numbers to produce pairs of output digital numbers, say A' and B'. The CORDIC circuit has two modes. In one mode of the CORDIC circuit, called rotate mode, the outputs are computed from the inputs such that A'=A cos $\theta$−B sin $\theta$, and B'=B cos $\theta$+A sin $\theta$.

By a trivial modification to the design of a CORDIC circuit, the multiplication by $\alpha$ can be included, so that $A' = \alpha(A \cos \theta - B \sin \theta)$, and $B' = \alpha(B \cos \theta + A \sin \theta)$.

In the rotate mode, the quantity $\theta$ is represented internally in the CORDIC circuit in the form of a set of control bits which are not changed during the rotate mode. A and B represent the real and imaginary components, respectively, of a complex number $C = A + iB$, where the CORDIC circuit will produce a complex output $C' = A' + iB'$. Hence $C' = (\cos \theta + i \sin \theta)C$. Again, it would be a trivial modification to include here the forgetting factor, $\alpha$. In the remainder of the discussion of the CORDIC circuits, however, it will be assumed (unless otherwise specified) that the output of a CORDIC circuit can include the forgetting factor, $\alpha$, even though not shown.

In the other mode of the CORDIC circuit, called setup mode, the response to inputs A and B includes setting the control bits, as well as computing outputs A' and B'. These control bits effect a rotation of angle $\theta$ for which the statements:

$A' = A \cos \theta - B \sin \theta = \pm \sqrt{A^2 + B^2}$, and $B' = B \cos \theta + A \sin \theta = 0$ are true. If A and B are considered to be the real and imaginary components, respectively, of a complex number $C = A + iB$, then the setup mode produces an output C' which is real.

In the algorithm described above, each of the 2N matrix right-multiplications may be effected by a CORDIC circuit. The function of the CORDIC circuit may be best described by reference to odd-numbered steps and then even-numbered steps. In odd-numbered steps it is desirable to multiply the last column of X by cos $\theta + i \sin \theta$, where the angle $\theta$ is selected to make the designated leader of this last column a real number. In so doing, the CORDIC is first used in its setup mode, with the real part of the designated column leader sent to the CORDIC input A and the imaginary part of the designated column leader sent to CORDIC input B. After the CORDIC controls are determined which represent a suitable $\theta$ such that the leader output is a real number, all the other numbers making up this last column are processed serially by the same CORDIC processor in its rotate mode. Hence, these sequences of numbers are each multiplied by the same cos $\theta + i \sin \theta$. Furthermore, in the last of these odd-numbered steps, the column will have only one element, the leader, hence it is not required to use the rotate mode this last step, such that only the setup mode of the CORDIC would be used on this last odd-numbered step.

In the above use of CORDIC circuits, it is not necessary to have a correction for the forgetting factor. However, in the interest of having a system with many identical parts, it may be adequate to use a CORDIC processor which does incorporate the forgetting factor, especially if the forgetting factor is very close to 1.0, or where the forgetting factor may be selectively applied by action of an additional control circuit.

There still remains to be discussed the even-numbered steps of the 2N matrix right-multiplications.

On the even-numbered (2k-th) steps, first the designated leaders of the two columns of appended matrix X, column k and column (N+1), are sent to the A and B inputs of a CORDIC circuit, in its setup mode, with the designated leader of column (N+1) of X directed to the B input. It will be understood, of course, that these designated leaders are real numbers, as a consequence of previous steps. The output which results has B' set to zero. The A' and B' outputs are written back into corresponding positions in X. Once the controls have been set which are an internal representation of the $\phi$ parameter, the other numbers making up the two columns being processed are presented to the CORDIC circuit in the manner discussed below.

Beginning with $j = k + 1$ and running to $j = N$, the real parts of the j-th numbers in column k and column (N+1) are sent respectively to the A and B inputs of a CORDIC circuit and the A' and B' outputs are written back, respectively, into the real part storages in X from which the A and B inputs were taken. Then the imaginary parts of the j-th numbers in column k and column (N+1) are sent respectively to the A and B inputs of another CORDIC circuit which uses the same controls as were established by the setup mode and the A' and B' outputs are written back, respectively, into the imaginary part storages in X from which the A and B inputs were taken. On the last even-numbered step, the two columns processed have only one element each, the leader elements (which do not have an imaginary component), so only the setup mode is used since the rotation mode is not required.

The forgetting factor is appropriately applied to the numbers computed to replace column k. It is not appropriately applied to numbers computed to replace the tacked-on column Y, but may be included if $\alpha$ is close to one, in the interest of having identical circuit components.

It is to be understood that this has been a description of how a CORDIC type of circuit can do the computations called for in the above algorithm. In the present invention, CORDIC circuits are used in this way, but the use of memory is quite different.

There is a way to combine odd-numbered and even-numbered steps of the above procedure together into a single, more elaborate step. In this combined procedure, three CORDIC circuits are designated as the $\theta$-CORDIC, the master $\phi$-CORDIC and the slave $\phi$-CORDIC, respectively. A complex number from the last column of the appended matrix X, say the j-th number in the column, is sent to the A and B inputs of the $\theta$-CORDIC with its real part directed to the A input and its imaginary part directed to the B input. Some time later the corresponding A' and B' outputs are available. These are directed to the two $\phi$-CORDICs. The A' output is directed to the B input of the master $\phi$-CORDIC and the B' output is directed to the B input of the slave $\phi$-CORDIC. Meanwhile, the j-th complex number in the other column of X being processed on this step is accessed and its real part is directed to the A input of the master $\phi$-CORDIC at the same time that its imaginary part is directed to the A input of the slave $\phi$-CORDIC. Some time later, when the A' and B' outputs of the two $\phi$-CORDICs become available, the A' outputs of the master and slave $\phi$-CORDICs, respectively, become the real and imaginary parts, respectively, of the j-th number in the updated column of matrix X, while the B' outputs of the master and slave $\phi$-CORDICs become, respectively, the real and imaginary parts of the j-th number in the last column of matrix X.

The foregoing CORDIC arrangement is a modification of the standard mathematical application of Givens transformations. This modified arrangement is suited for dealing with complex data. It should now be appreciated that the first step is to deal with the single tacked-on column of complex data which is to be applied to the Cholesky lower triangular matrix L. A CORDIC processor is used on this column to make the leading element real, by use of the CORDIC setup mode applied to the leader, and the rotation mode applied to the other elements in the tacked-on column. Meanwhile, since the lead element of the k-th column of the triangular matrix is also real, the setup phase now can be applied to these two columns. This is accomplished by feeding the above real numbers to one CORDIC processor, which accomplishes the setup phase of the Givens transformation. The actual transformation of the two columns is accomplished using the two master/slave CORDIC processors, one of which works on the real parts and one of which works on the imaginary parts. These three CORDIC processors, together with storage capability, are combined to create a fundamental building block of the present invention: the supercell.

Referring to FIG. 1 a schematic diagram of a supercell 10 of the present invention is shown. It will be appreciated that the most recent observation vector P(n) is a collection of words representing observations from all antenna elements and will be inputted as a column, Y, to be tacked onto the existing Cholesky matrix. The existing Cholesky matrix and the tacked-on column form the appended matrix X, which after processing will yield the new updated Cholesky matrix L(n). The latter being the desired output of the present invention.

The tacked-on vector Y will be understood as comprising a real component indicated as signal $S_a$ and an imaginary component indicated as signal $S_b$ as applied to the inputs A and B, respectively, of CORDIC processor 12 shown in FIG. 1. As the leader of Y is presented to CORDIC processor 12 in its setup mode, it rotates the complex number A+iB of the tacked-on column, finding a real angle $\theta$ such that the lead element A'+iB of the output of CORDIC processor 12 is real. Thereafter the remaining complex numbers of the tacked-on column are multiplied by $\cos\theta + i\sin\theta$ using the rotate mode. This completes the rotation step of CORDIC processor 12 and the outputs A', B' of CORDIC processor 12 will then be applied to the B inputs of master CORDIC processor 14 and slaved CORDIC processor 16.

It should be understood that memory 18 holds the data representative of the column of the Cholesky matrix to be updated. The real component of the memory's column data, A', is applied to CORDIC processor 14 at its A-input and the memory's imaginary component, B', is applied to CORDIC processor 16 at its A-input. (Not shown in FIG. 1 is a capability of applying the fixed multiplier $\alpha$ to the information entering memory 18. It will be appreciated, however, that such function is preferably performed within the supercell. Hence, the internal architecture of a supercell 10 will preferably include column memory, three CORDIC processors and associated multipliers.)

By now it will be clear that the memory input to be applied to the CORDIC processors 14 and 16 represents the column of the Cholesky matrix to be updated. This data is stored in memory 18 with a gain matching the gain experienced at the output of CORDIC processor 12.

In operation, the input of the most recent vector Y to be tacked on as a new column goes to CORDIC 12, where a rotation is performed to make the leading element real. The complex number from memory 18 and the complex number from CORDIC processor 12 are now inputted to the master/slave CORDIC processors 14, 16. The real parts of each number become the two inputs to master CORDIC processor 14 and the imaginary parts are the two inputs to slave CORDIC processor 16. CORDIC processor 14 in its setup mode rotates the first arriving element (comprised of the lead element of output of CORDIC 12, which is a real number, and the lead element of the column from memory, which is a real number) in accordance with the statements:

$$L \leftarrow (L \cos\phi + Y \sin\phi), \text{ and}$$

$$Y \leftarrow (Y \cos\phi - L \sin\phi),$$

where the two actions are effected simultaneously and where $\phi$ is such that the leader of Y becomes zero, and applies the same rotation to all its other elements in sequence.

CORDIC processor 16 is slaved (in the sense of using the same control bits) to CORDIC processor 14, and processes the imaginary outputs of CORDIC processor 12 and memory 18. CORDIC processor 14 provides the real output, $S_{a'}$, of the tacked-on column as modified and the slaved processor 16 provides the imaginary output, $S_{b'}$, as outputted by supercell 10.

Figure 2:
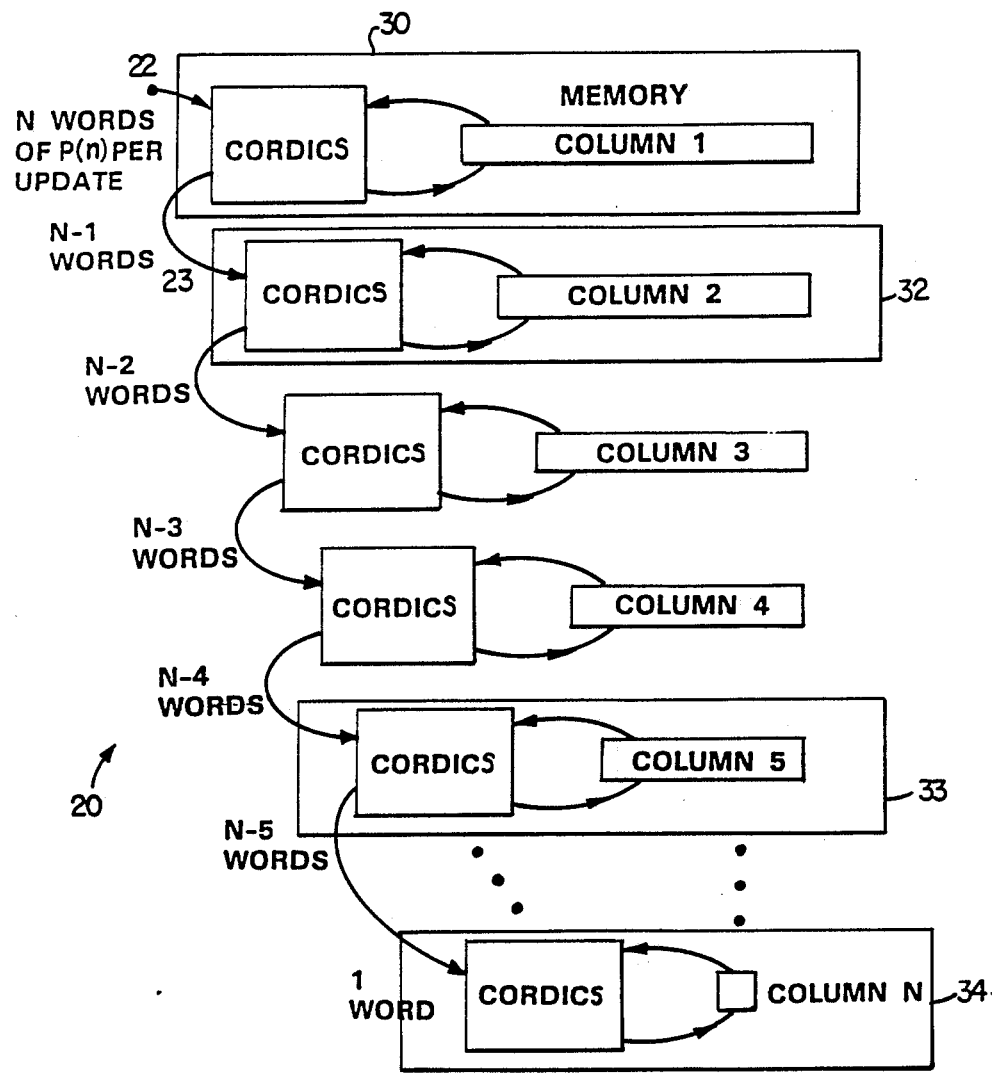
FIG. 2 is a block diagram of a linear systolic array.

Referring now to FIG. 2, a pipelined array 20 of N supercells 10 is shown. It will be appreciated that N supercells are shown in FIG. 2 coupled in a serial, systolic configuration whereby the most current observation vector P(n) is applied at input 22 to a first supercell 30. The output of supercell 30 is applied to the input 23 of supercell 32. The input to supercell 32 comprises N−1 words representative of the tacked-on column, as it has been modified by the first two matrix multiplications $Q_1$ and $Q_2$. This processing continues until the last supercell 34 of the pipelined array 20 receives one word from the prior supercell 33, representative of the tacked-on column as it has been modified by multiplications $Q_{2N-1}$ and $Q_{2N}$. Furthermore, in the same manner that the memory of supercell 30 holds the "column 1" data to be updated by the newest observation vector P(n), the memory of supercell 34 holds the column data to be updated by the single word applied to this supercell.

Upon further study of FIG. 2, it will become apparent that supercell 30 will process a column having a length of N words and consequently must store a column of N words in its memory. Meanwhile, processor 34 will store only one word in its memory representative of column N, since the other N−1 words of column N are known to be always zero and need not be explicitly represented or computed. As a result, near fifty per cent efficiency would be achieved by such an array 20 if it were comprised of N identical, or substantially identical, supercells, each having a memory storage capacity of N words.

Referring now to FIG. 3, there is shown the preferred folded systolic configuration 40 of the present invention (where N is an even number). In this configuration, near 100% efficiency is achieved by pairing longer and shorter columns together such that column lengths always equal a constant, the constant being the memory length of each supercell (and equal to N+1).

More particularly, if, for example, each observation vector P(n) is comprised of 64 words per update (representing 64 antenna elements), such information is applied to a switch S1 which will direct such vector information to first supercell 44 where it is used t update the 64 words of the previous column 1 of matrix L stored in memory 45. That processed data (less one zeroed element) is sent via switch S2 to second supercell 46 to compute a new 63 word update for column 2 of the Cholesky array, storing this updated information in its memory 47 for the next-to-come update, and outputting 62 words to the next supercell 48 through switch S3.

This systolic pumping of column update information (shortened one element per supercell) continues down to the $$\frac{N}{2}$$

supercell 49, which in this example is the 32nd supercell. Hence the update information arriving at switch S32 is inputted to the $\theta$-CORDIC processor of supercell 49 for updating the 33 words of column 32 information stored in memory 50. This new information is now stored in memory 50 as it is outputted (shortened one element) to switch S32, and because this switch is the last switch of the array, such outputted data is returned via switch 32 to the $\theta$-CORDIC processor of this same supercell 49 for updating the 32 words of column 33 data also stored in memory 50.

The shortened output from supercell 49 representative of updated information from column 33 is applied to the next previous supercell in the array, which continues in sequence until arriving at supercell 46 via switch S2 from supercell 48 which receives two words for update of column 63 within memory 47 of supercell 46. The shortened output from supercell 46 is one word derived from update of column 63. This single word is applied via switch S1 to the memory of supercell 44 to update that portion of memory 45 representative of column 64.

Hence, in view of the folded systolic architecture of the present embodiment, each supercell may contain three CORDIC processors and a memory comprising N+1 words of storage. Each supercell uses the entire memory of N+1 words, as a result of pairing appropriate column lengths of the lower triangular Cholesky matrix. Furthermore, it will be appreciated that while circuitry for the forgetting factor is not shown in FIG. 3, addition of such compensating circuitry may be achieved by those skilled in the art.

Also not shown is means for utilizing the present invention in a nulling system. Nonetheless, it will be understood that the contents of the memories of the supercells of the array is representative of the Cholesky factor, and may be processed in a conventional manner by another processor to yield suitable weights for nulling out the unwanted signals which have been received in an antenna of N elements of a system utilizing this invention.

It will now be appreciated that it is possible to design a supercell with CORDIC circuits configured such that new data may be presented to the A and B inputs of a CORDIC circuit several times while the first A and B input data are being internally processed. The number of 'problems' being worked on by the CORDIC at once is called the latency of the CORDIC. If the time interval between when a circuit may accept new pairs of inputs, $(A_j, B_j)$, is T, and if the outputs $(A'_j, B'_j)$, emerge at the time inputs $(A_{j+\mu}, B_{j+\mu})$ are input, then $\mu$ is the latency of the CORDIC circuit.

Many digital arithmetic circuits can be designed which have latency in the sense that new problems can be begun while old problems are being processed internally. However, CORDIC circuits may be designed with an additional property relating to the setup mode and the rotate mode. The control bits which are used in the rotate mode of a CORDIC may be determined, in the setup mode, a few bits or even one bit at time. Therefore, neither the setup mode nor the rotate mode should be considered as a mode of the entire CORDIC circuit, but either is only applied to a particular (A, B) pair being processed by the circuit. It is possible, indeed common, to design CORDIC circuits so that the $\theta$ or $\phi$ parameters determined in the setup mode for a particular $(A_j, B_j)$ can be used in the rotate mode on the very next pair $(A_{j+1}, B_{j+1})$ presented to the CORDIC circuit. In this invention, CORDIC circuits have been designed in this way.

Note that if the latency of a CORDIC is $\mu$, in the supercell described above, the time for a quantity in a tacked-on column to go from the input of a supercell to its output is $2\mu \equiv \tau$, which is the latency of a supercell. It should be easy to see that a supercell can begin new problems involving pairs of complex numbers (quadruplets of real numbers) every T seconds, with $\tau$ such problems being started before the first quadruplet B', A', B', A' of supercell 10 emerges from its master and slave $\theta$-CORDICs. It is only a slight complication that one pair of numbers from any quadruplet (which come from the memory) must be presented internally with a delay of $\mu T$ relative to the corresponding other pair of numbers (presented at the input) in the quadruplet.

It should now be appreciated that a preferred folded systolic array of the invention will enable simultaneously employing $$\frac{N}{2}$$

supercells to repetitively update the Cholesky factor (where N is an even number), or $$\frac{N+1}{2}$$

supercells to repetitively update the Cholesky factor (if N is an odd number). For ease of discussion, only the case where N is an even number is described below, the other case involving a trivial modification.

In the preferred folded array, each of the $$\frac{N}{2}$$

supercells has the responsibility to update repetitively two columns of the Cholesky factor. If the supercells are numbered from k=1 to $$\frac{N}{2},$$

then supercell k has the responsibility to update columns k and (N+1−k) of the Cholesky factor. Note that these columns have exactly (N+1−k) and k words respectively, so that a total of N+1 words of memory will suffice to store the two columns in every case. All but two of these words of memory must be able to store complex numbers. Two of the words will store the respective leaders of the two columns, and these are, as earlier shown, real numbers. Generally, all supercells operate independently of one another under control of the same synchronous clock.

Because it must be able to update the first column of L(n), the first supercell must be presented with appropriate input data from P(n). The N complex numbers making up P(n) are presented to its $\theta$-CORDIC one complex word at a time on N successive time intervals. With each complex word, the real part is presented to the A-input of the $\theta$-CORDIC and the imaginary part is presented to the B-input of the $\theta$-CORDIC. On the first of these time intervals, the pair are marked with a special pulse designating the first (A, B) pair of inputs as a 'leader'.

Following N successive time intervals, there are b other time intervals on which no information is presented to the $\theta$-CORDIC. b is a choice of the designer of the system and b may be zero.

Following these N+b intervals, there is an interval in which the $\theta$-CORDIC takes its A and B inputs from the second supercell's outputs. The A input of the $\theta$-CORDIC is taken from the B' output of the master $\phi$-CORDIC of the second supercell and the B-input of the $\theta$-CORDIC of the first supercell is taken from the B'-output of the slave $\phi$-CORDIC of the second supercell. This interval is also marked with a special pulse designating the (A, B) pair as a leader. There follow b more time intervals during which the $\theta$-CORDIC of the first supercell is presented with no information.

After the N+1+2b intervals just described, the whole process is repeated with the inputs from the next current observation vector P(n+1) in place of those from P(n). After N+1+2b more intervals, the observation vector P(n+2) is input, and so on, indefinitely.

The behavior of the k-th supercell may be described in general terms applicable for any k from k=1 to $$\frac{N}{2}.$$

However, when k=1, some of the inputs may come from the 'outside world' instead of from a prior supercell. Hence, the discussion below is most easily understood if the case of $$\frac{N}{2} \geq k > 1$$

is kept in mind.

Beginning with the arrival, at supercell k's $\theta$-CORDIC's A and B inputs, of an (A, B) pair, marked with a special pulse designating a leader, from the B' outputs of supercell (k−1)'s master and slave $\phi$-CORDICs respectively, supercell k takes inputs from supercell (k−1) for N+1−k intervals, followed by b blanks As any (A, B) pair marked by a special pulse designating it as a leader propagates through a supercell, the special pulse is used as a signal to make the $\theta$-CORDIC operate in setup mode. A pulse derived from the special pulse, with appropriate delay, is used to make the master $\phi$-CORDIC of the same supercell use its setup mode, and the controls generated by the setup mode in the master $\phi$-CORDIC must be generated or set up in the slave $\phi$-CORDIC as well. There are several convenient methods which might be used to accomplish the setup of the slave $\phi$-CORDIC with the same controls as the master $\phi$-CORDIC. For example, the slave $\phi$-CORDIC does no useful work when the master $\phi$-CORDIC is in setup mode because its A and B inputs are (0, 0). Therefore, instead, it may be given the same (A, B) inputs as are given to the master $\phi$-CORDIC during that interval—given the same inputs it must set its controls in the same manner as the master $\phi$-CORDIC.

The memory accessible to the $\phi$-CORDICs, from which their two A-inputs are set, is accessed one complex word at a time (except that a leader word is always real-valued). As a pair of components are presented to the A inputs of the two $\phi$-CORDICS, a pair of outputs are created at the two A' outputs of the same $\phi$-CORDICs and these may be written into the same locations in memory just read (although other schemes for organizing data in memory may be conceived).

The B'-outputs of the two $\phi$-CORDICs of supercell k need to be read sometimes by supercell (k+1) and sometimes by supercell (k−1) (with two exceptions—the first supercell's output is read only by the second supercell, and supercell $$\frac{N}{2} \cdot s$$

output is read by its own $\theta$-CORDIC's inputs and by its nearest neighbor). It is necessary for supercell k to mark some of its outputs (B' outputs of the $\phi$-CORDICs) as leaders. Hence, by any conventional means, a special pulse marking an output as a leader is attached to the supercell output exactly $\tau+1$ intervals after a special pulse is noted at its input.

After the arrival, at supercell k's $\theta$-CORDIC's A and B inputs, of (N+1−k) successive (A, B) pairs from supercell (k−1) beginning with one marked as a leader, followed by b blanks, an (A, B) pair marked as a leader will be available from supercell (k+1). This will be the first of k successive (A, B) pairs, from the B' outputs of supercell (k+1)'s master and slave $\phi$-CORDICs, respectively. These pairs are also followed by b blank intervals. Supercell k processes inputs from supercell (k+1) in the same manner as it processes inputs taken from supercell (k−1). After it has processed k inputs and b blanks, there will appear at supercell k's $\theta$-CORDIC's A and B inputs, another (A, B) pair marked as leader from supercell (k−1), which we may consider the beginning of a new update cycle.

In order for the data arriving at supercell k from supercell (k+1) and from supercell (k−1) to never arrive at the same time at the same $\theta$-CORDIC, it is sufficient to require that $\tau+1$ must be an integer multiple of (N+1+2b). The system designer must see to it that this congruence is satisfied. If N is large, it will usually be appropriate to choose $$\tau = \frac{N}{2} + b.$$

Each supercell in this scheme has responsibility for updating two columns of L. The memory organization of data for these two columns must be such that the correct data reaches the A-inputs of the master and slave $\phi$-CORDICs at the correct time. This is relatively easy to assure in any of several ways. As long as each cell of the memory is read exactly $N+1+2b-\mu$ time intervals after it has been written, the contents of the memory will be self-synchronized to contain the correct data (assuming that the memory was initially all zeros or that the forgetting factor has caused all old data to become insignificant). Other memory organization schemes may be designed. For example, it is possible to use one of the special pulses marking a leader as a reset for a memory address counter.

A scheme is necessary to assure that the circuit initializes itself so that each supercell correctly chooses to read data from the previous or subsequent supercell. Several easy schemes for achieving this are possible, based on the regularity of the process, since, once they have been synchronized, each supercell alternately gets its data in blocks, originating alternately from above or from below.

There are two further considerations for application of the present invention. One is that the word-length and other parameters of the CORDIC processors and the memory making up the supercell must be adequate to give usable numerical results. The other is that some means must be provided to deliver the updated Cholesky factors, when needed, to another machine which will make use of them in some further computation. With regard to the second matter, it is important to realize that the supercells are always performing updates of their assigned columns of matrix L but that these updates at any instant of time do not all pertain to the identical current observation vector—indeed the first supercell, shortly just after it finishes accepting the last complex word from P(n) to update column 1 of L(n−1) into column 1 of L(n), must accept one word from the second supercell and begin updating its column N from a much older instance of matrix L. Nevertheless, this will not present an impediment to the skilled system designer.

While the present invention has been described with respect to the Cholesky factor, it will be appreciated that other related forms of a lower triangular matrix may be employed within the spirit and scope of the present invention. Also, the observation vectors from which the present invention computes Cholesky factors might originate from other sources than arrays of antenna elements, and the Cholesky factors computed in practice of the present invention might be used for purposes other than computing weights for a nulling system. Furthermore, several other modifications and variations of the present invention are possible when considered in the light of the above teachings. It is therefore understood that the scope of the present invention is not to be limited to the details disclosed herein, may be practiced otherwise than is as specifically described, and is intended only to be limited by the claims appended hereto:

What is claimed is:

1. A circuit for computing from complex data signals, each signal containing N words, the values of the columns of a triangular matrix of N columns and N rows (where N is an even number), the circuit comprising:
   N/2 subcircuits,
   each subcircuit having at least one CORDIC processor and a memory,
   the subcircuits connected in a systolic array,
   the first subcircuit of the array providing input capability to the array for receiving each said signal, and
   wherein each subcircuit updates and stores in its memory, based upon each said signal, the value of two assigned complementary columns of said triangular matrix, where the length of any of said two columns combined together is equal to a constant.

2. The circuit of claim 1, wherein each subcircuit further comprises a device for applying a forgetting factor to the value of at least one column of said triangular matrix updated b that subcircuit.

3. The circuit of claim 2, wherein each subcircuit comprises a first, a second and a third CORDIC processor and said memory.

4. The circuit of claim 1, wherein each subcircuit comprises a first, a second and a third CORDIC processor and said memory, said first CORDIC processor receiving each said signal and translating it to said second CORDIC and said third CORDIC processors, said second CORDIC and third CORDIC processors coupled to said memory, said memory retaining a complex number related to each said signal as applied to it from an output of said second and of said third CORDIC processor.

5. The circuit of claim 4 wherein the memory of each said subcircuit is capable of storing at least N+1 words, and wherein said constant is equal to N+1 words.

6. The circuit of claim 4, wherein the output of the last subcircuit is coupled to its own input.

7. The circuit of claim 4, wherein said first CORDIC processor is disposed to perform a rotation upon each said signal to make the leading element of the signal real, the output of this processor being a second complex number and being applied along with the complex number from said memory to the inputs of said second and third CORDIC processors, where the real parts of the two above said complex numbers are inputted to said second CORDIC processor and the imaginary parts of the two above said complex numbers are inputted to said third CORDIC processor, said second CORDIC processor providing a real output and said third CORDIC processor providing an imaginary output, these latter two outputs being coupled to the input of at least one said subcircuit.

8. The circuit of claim 1, wherein said array is coupled to a nulling processor.

9. The circuit of claim 1, wherein said matrix is a Cholesky matrix and the output of the last subcircuit is coupled to its own input.

10. A circuit for computing from complex data signals, each signal containing N words, the values of the columns of a triangular matrix of N columns and N rows (where N is an odd number), the circuit comprising:
    (N+1)/2 subcircuits,
    each subcircuit having at least one CORDIC processor and a memory,
    the subcircuit connected in a systolic array,
    the first subcircuit of the array providing input capability to the array for receiving each said signal, and
    wherein, except for the first subcircuit, each subcircuit updates and stores in its memory, based upon each said signal, the value of two complementary columns of said triangular matrix, where the length of any of said two columns combined together is equal to a constant.

11. The circuit of claim 10, wherein each subcircuit further comprises a device for applying a forgetting factor to the value of at least one column of said triangular matrix updated by that subcircuit.

12. The circuit of claim 11, wherein each subcircuit comprises a first, a second and a third CORDIC processor and said memory.

13. The circuit of claim 10, wherein each subcircuit comprises a first, a second and a third CORDIC processor and said memory, said first CORDIC processor receiving each said signal and translating it to said second and said third processors, said second and third processors coupled to said memory, said memory retaining a complex number related to each said signal as applied to it from an output of said second and of said third CORDIC processor.

14. The circuit of claim 13 wherein the memory of each said subcircuit is capable of storing at least N words, and wherein said constant is equal to N words.

15. The circuit of claim 13, wherein the output of the last subcircuit is coupled to its own input.

16. The circuit of claim 13, wherein said first CORDIC processor is disposed to perform a rotation upon each said signal to make the leading element of the data real, the output of this processor being a second complex number and being applied along with the complex number from said memory to the inputs of said second and third CORDIC processors, where the real parts of the two above said complex numbers are inputted to said second CORDIC processor and the imaginary parts of the two above said complex numbers are inputted to said third CORDIC processor, said second CORDIC processor providing a real output and said third CORDIC processor providing an imaginary output, these latter two outputs being coupled to the input of at least one said subcircuit.

17. The circuit of claim 10, wherein said circuit is coupled to a nulling processor.

18. The circuit of claim 10, wherein said matrix is a Cholesky matrix and the output of the last subcircuit is coupled to its own input.

19. In a processing circuit having N/2 subcircuits (where N is an even number), the input of the first subcircuit disposed to accept a data signal of N words derived from a signal source having N elements, each subcircuit having at least one CORDIC processor and a memory, a method for determining a triangular matrix representative of said data signal inputted to the circuit, comprising the steps of:

(a) applying at least one said complex data signal containing N words, to the input of the first subcircuit, (b) said first subcircuit processing said complex data signal and storing a result in its memory, the subcircuit outputting data representative of said complex signal, but reduced by one word, being a first output of that subcircuit, (c) applying said first subcircuit first output to the second of said subcircuits, (d) said second subcircuit processing said first subcircuit first output and storing a result in its memory, (e) said second subcircuit providing at its output data derived from said first subcircuit first output, but reduced by one word, called a first output of the second subcircuit, (f) applying said second subcircuit first output to the input of the next of a sequence of serially coupled intermediate subcircuits from a third subcircuit up to and including an $$\frac{N}{2} - 1$$

subcircuit, where all of these intermediate subcircuits are connected sequentially and each one processing data inputted to it from its neighboring subcircuit and storing a result in its memory and outputting data derived from the data inputted to it but reduced by one word, in a manner analogous to that described above for the second subcircuit, such that a first output containing $$\frac{N}{2} + 2$$

words of the $$\frac{N}{2} - 1$$

subcircuit is applied to the input of the $$\frac{N}{2}$$

subcircuit, the latter processing its $$\frac{N}{2} + 2$$

input in said analogous manner, (g) applying a first output of the $$\frac{N}{2}$$

subcircuit containing $$\frac{N}{2} + 1$$

words to the input of the $$\frac{N}{2}$$

subcircuit, (h) applying a second output of subcircuit $$\frac{N}{2}$$

containing $$\frac{N}{2}$$

words to the input of subcircuit $$\frac{N}{2} - 1,$$

the latter in turn enabling said sequentially connected intermediate subcircuits to cooperate such that a second output of said third subcircuit contains two words and is applied to the input of said second subcircuit, where each of said intermediate subcircuits processes its input data and stores a result in its memory and outputs data derived from its input data, but reduced one word, to a neighboring subcircuit,
(i) applying a second output of the second subcircuit containing one word to the first subcircuit, the latter processing said input and storing a result in memory, and
(j) making available the contents of the memory of each said subcircuit for determining the contents of said matrix.

20. The method of claim 19 comprising the further step of applying said memory contents to a circuit assisting in nulling a portion representative of said data signal out of a greater signal which includes said data signal.

21. In a processing circuit having $$\left(\frac{N+1}{2}\right)$$

subcircuits (where N is an odd number), the input of the first subcircuit being disposed to accept a data signal of N words derived from a source having N elements, each subcircuit having at least one CORDIC processor and a memory, a method for determining a triangular matrix representative of said data signal inputted to the circuit, comprising the steps of:
(a) applying at least one said vector data signal containing N words, to the input of the first subcircuit,
(b) said first subcircuit processing said vector data signal and storing a result in its memory, the subcircuit outputting data representative of said vector signal, but reduced by one word, being a first output of that subcircuit,
(c) applying said first subcircuit first output to the second of said subcircuits,
(d) said second subcircuit processing said first subcircuit first output and storing a result in its memory,
(e) said second subcircuit making available at its output data derived from said first subcircuit first output, but reduced by one word, called a first output of the second subcircuit,
(f) applying said second subcircuit first output to the input of the next of a sequence of serially coupled intermediate subcircuits from a third subcircuit up to and including an $$\frac{(N+1)}{2} - 1$$

subcircuit, where all of these intermediate subcircuits are connected sequentially and each one processing data inputted to it from a neighboring subcircuit and storing a result in its memory and outputting data derived from the data inputted to it but reduced by one word, in a manner analogous to that described above for the second subcircuit, such that a first output containing $$\frac{N+1}{2}$$

words of the $$\frac{(N+1)}{2} - 1$$

subcircuit is applied to the input of the $$\frac{(N+1)}{2}$$

subcircuit, the latter processing its $$\frac{N+1}{2}$$

word input in said analogous manner,
(q) applying a first output of the $$\frac{N+1}{2}$$

subcircuit containing $$\frac{N+1}{2} - 1$$

words to its own input,
(h) applying a second output of subcircuit $$\frac{N+1}{2}$$

containing $$\frac{(N+1)}{2} - 2$$

words to the input of subcircuit $$\frac{N+1}{2} - 1,$$

the latter in turn enabling said sequentially connected intermediate subcircuits to cooperate such that a second output of said third subcircuit contains one word and is applied to the input of said second subcircuit, each of said intermediate subcircuits processing its input data and storing a result in its memory and outputting data derived from its input data, but reduced one word, to a neighboring subcircuit, and
providing the contents of the memory of each said subcircuit for determining the contents of said triangular matrix.

22. The method of claim 21 comprising the further step of applying said memory contents to a circuit assistinq in nulling a portion representative of said data signal out of a greater signal which includes said data signal.

23. The method of claim 21 further comprising the step of applying a forgetting factor to said input data of each said subcircuit.

* * * * *

UNITED STATES PATENT AND TRADEMARK OFFICE
CERTIFICATE OF CORRECTION

PATENT NO. : 4,972,361

DATED : November 20, 1990

INVENTOR(S) : Charles M. Rader

It is certified that error appears in the above-identified patent and that said Letters Patent is hereby corrected as shown below:

Column 1, line 33, after "elements" and before "Each" please insert --.--.

Column 1, line 38, after "signals" delete "o" and insert --on--.

Column 2, line 59, after "If" and before "to" please insert --,--.

Column 3, line 19, before "where" insert --(--.

Column 9, line 34, please delete "$S_a$" and insert --$S_A$--.

Column 9, line 35, please delete "$S_b$" and insert --$S_B$--.

Column 9, line 41, please delete "iB" and insert --iB'--.

Column 10, line 28, please delete "$S_a$'" and insert --$S_A$'--.

Column 10, line 30, please delete "$S_b$'" and insert --$S_B$'--.

Column 11, line 5, please delete "t" and insert --to--.

Column 16, claim 2, line 6, please delete "b" and insert --by--.

Signed and Sealed this

Twenty-eighth Day of April, 1992

Attest:

HARRY F. MANBECK, JR.

*Attesting Officer*      *Commissioner of Patents and Trademarks*